(12) United States Patent
Delaney et al.

(10) Patent No.: US 10,498,701 B2
(45) Date of Patent: Dec. 3, 2019

(54) SYSTEMS AND METHODS FOR DYNAMICALLY VARYING WEB APPLICATION FIREWALL SECURITY PROCESSES BASED ON CACHE HIT RESULTS

(71) Applicant: Symantec Corporation, Mountain View, CA (US)

(72) Inventors: Colin Delaney, Waterloo (CA); Chandana Sembakutti, Waterloo (CA)

(73) Assignee: Symantec Corporation, Mountain View, CA (US)

(*) Notice: Subject to any disclaimer, the term of this patent is extended or adjusted under 35 U.S.C. 154(b) by 157 days.

(21) Appl. No.: 15/632,318

(22) Filed: Jun. 24, 2017

(65) Prior Publication Data
US 2018/0375830 A1 Dec. 27, 2018

(51) Int. Cl.
*H04L 29/06* (2006.01)
*G06F 12/0813* (2016.01)
*G06F 21/55* (2013.01)

(52) U.S. Cl.
CPC ...... *H04L 63/0263* (2013.01); *H04L 63/0209* (2013.01); *H04L 63/0218* (2013.01); *H04L 63/1425* (2013.01); *H04L 63/1433* (2013.01); *G06F 12/0813* (2013.01); *G06F 21/554* (2013.01); *G06F 2212/154* (2013.01); *G06F 2212/60* (2013.01); *G06F 2212/62* (2013.01);
(Continued)

(58) Field of Classification Search
CPC ............ H04L 63/0263; H04L 63/0209; H04L 63/0218; H04L 63/1425; H04L 63/1433; H04L 2463/145; H04L 2463/141; G06F 21/554; G06F 12/0813; G06F 2212/62; G06F 2212/154; G06F 2212/60
See application file for complete search history.

(56) References Cited

U.S. PATENT DOCUMENTS

| | | | |
|---|---|---|---|
| 8,561,181 B1* | 10/2013 | Hernacki | G06F 21/552 726/1 |
| 2005/0055509 A1* | 3/2005 | Ling | G06F 12/0808 711/133 |

(Continued)

OTHER PUBLICATIONS

Symantec Secure Web Gateway: ProxySG & ASG; https://www.symantec.com/products/web-and-cloud-security/secure-web-gateway-proxy-sg-and-asg; as accessed on Sep. 21, 2017.
(Continued)

*Primary Examiner* — J. Brant Murphy
(74) *Attorney, Agent, or Firm* — FisherBroyles, LLP

(57) ABSTRACT

A computer-implemented method for dynamically varying web application firewall security processes based on cache hit results may include (i) identifying, at a computing device, a request directed to a web application resource protected by the computing device, (ii) determining, in response to identifying the request, whether a response to the request will be served from a cache stored on the computing device, (iii) determining, based at least in part on whether the response to the request will be served from the cache, a level of security processing to apply to the request, and (iv) applying the determined level of security processing to the request. Various other methods, systems, and computer-readable media are also disclosed.

20 Claims, 6 Drawing Sheets

(52) U.S. Cl.
CPC .. *H04L 2463/141* (2013.01); *H04L 2463/145* (2013.01)

(56) References Cited

U.S. PATENT DOCUMENTS

| | | | | |
|---|---|---|---|---|
| 2010/0199345 A1* | 8/2010 | Nadir | .................. | H04L 63/02 726/11 |
| 2011/0126268 A1* | 5/2011 | Youngworth | ......... | G06F 12/109 726/4 |
| 2011/0126269 A1* | 5/2011 | Youngworth | ......... | G06F 12/109 726/4 |
| 2014/0149687 A1* | 5/2014 | Moll | .................. | G06F 12/0831 711/146 |
| 2014/0373129 A1* | 12/2014 | Li | .................. | H04L 63/0218 726/12 |
| 2015/0026757 A1* | 1/2015 | Reddy | .................. | H04L 63/10 726/1 |
| 2016/0006750 A1* | 1/2016 | Yang | .................. | G06F 21/55 726/22 |
| 2016/0182534 A1* | 6/2016 | Yang | .................. | G06F 21/55 726/1 |
| 2016/0226879 A1* | 8/2016 | Chan | .................. | H04L 63/083 |

OTHER PUBLICATIONS

Breno Silva; "ModSecurity Performance Recommendations"; https://www.trustwave.com/Resources/SpiderLabs-Blog/ModSecurity-Performance-Recommendations/; May 31, 2013.
Squid-Cache.org; Squid: Optimising Web Delivery; http://www.squid-cache.org/; as accessed on Sep. 21, 2017.

* cited by examiner

SYSTEMS AND METHODS FOR DYNAMICALLY VARYING WEB APPLICATION FIREWALL SECURITY PROCESSES BASED ON CACHE HIT RESULTS

BACKGROUND

Attacks that target web application resources are often difficult to detect, and when these attacks go undetected, the results can be costly for enterprises and end users. To mitigate the risks a compromise poses to their reputation and ongoing operations, enterprises have increasingly turned to web application firewalls to protect their web properties and enforce the security and privacy of their web applications. In contrast to intrusion prevention systems, which may interrogate traffic against signatures and anomalies, web application firewalls may interrogate the behavior and logic of what is being requested and returned at a web server. As a result, web application firewalls may protect against various types of evasive attacks, such man-in-the middle attacks, SQL injection attacks, and cross-site scripting attacks.

While web application firewalls may provide protection from various types of crippling attacks, traditional web applications firewalls may be inefficient and inflexible. For example, because the processing involved in interrogating the behavior and logic of web-server requests may be computationally expensive, web application firewalls may degrade network throughput. Traditional web application firewalls may also lack the flexibility to adapt to changing network demands and security threat levels. The instant disclosure, therefore, identifies and addresses a need for improved systems and methods for protecting resources via web application firewalls.

SUMMARY

As will be described in greater detail below, the instant disclosure describes various systems and methods for dynamically varying web application firewall security processes based on cache hit results. In one example, a method for accomplishing such a task may include (i) identifying, at a computing device, a request directed to a web application resource protected by the computing device; (ii) determining, in response to identifying the request, whether a response to the request will be served from a cache stored on the computing device; (iii) determining, based at least in part on whether the response to the request will be served from the cache, a level of security processing to apply to the request; and (iv) applying the determined level of security processing to the request. In some examples, the computing device may represent a web application firewall device and/or a gateway.

In one example, determining the level of security processing to apply to the request may include (i) determining that the response to the request will be served from the cache stored on the computing device and then (ii) lowering the level of security processing to apply to the request. In this example, the method may also include (i) determining, by applying the lowered level of security processing to the request, that the request does not represent a security risk and then (ii) serving the request with the response from the cache stored on the computing device.

In some examples, the determined level of security processing may be based on at least one characteristic of the request and/or at least one characteristic of the web application resource to which the request is directed. For example, determining the level of security processing to apply to the request may include (i) determining that the request is associated with an authenticated user and then (ii) lowering the level of security processing to apply to the request. In another example, determining the level of security processing to apply to the request may include (i) determining that the web application resource to which the request is directed serves static content that does not require user input and then (ii) lowering the level of security processing to apply to the request.

In one example, determining the level of security processing to apply to the request may include identifying an administrator-defined level of security processing to apply to the request. In this example, applying the determined level of security processing to the request may include applying the administrator-defined level of security processing to the request.

In some examples, the method may also include (i) identifying, by applying the determined level of security processing to the request, a potential security risk associated with the request and then (ii) performing, in response to identifying the potential security risk, a security action in an attempt to ameliorate the potential security risk.

In one embodiment, a corresponding system for dynamically varying web application firewall security processes based on cache hit results may include several modules stored in a memory device, including (i) an identifying module that identifies a request directed to a web application resource protected by the system; (ii) a first determining module that determines, in response to identifying the request, whether a response to the request will be served from a cache stored on the system; (iii) a second determining module that determines, based at least in part on whether the response to the request will be served from the cache, a level of security processing to apply to the request; (iv) an applying module that applies the determined level of security processing to the request; and (v) at least one physical processor that executes the identifying module, the first determining module, the second determining module, and the applying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, at the computing device, a request directed to a web application resource protected by the computing device; (ii) determine, in response to identifying the request, whether a response to the request will be served from a cache stored on the computing device; (iii) determine, based at least in part on whether the response to the request will be served from the cache, a level of security processing to apply to the request; and (iv) apply the determined level of security processing to the request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
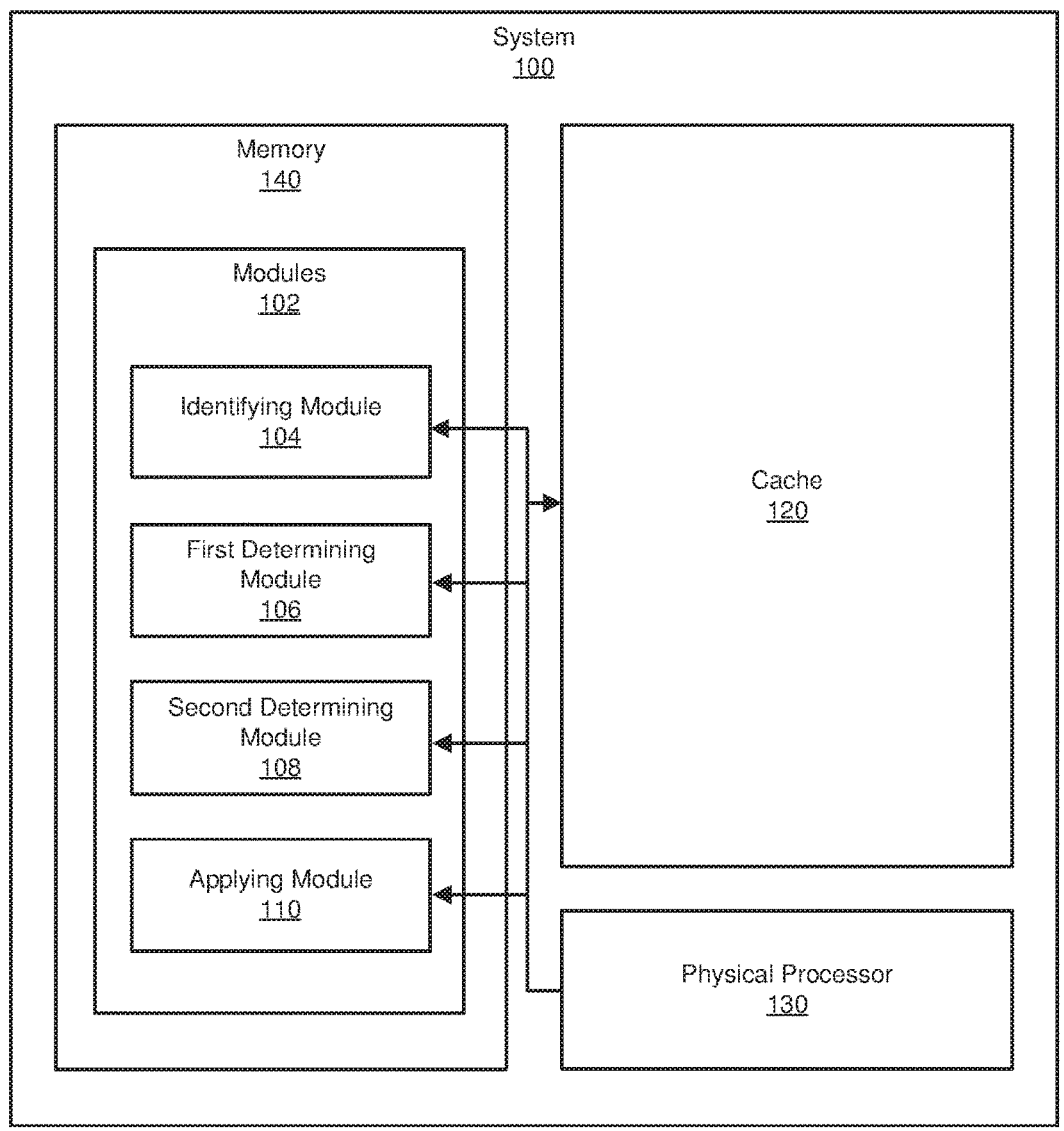
FIG. 1 is a block diagram of an example system for dynamically varying web application firewall security processes based on cache hit results.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for dynamically varying web application firewall (WAF) security processes based on cache hit results. By customizing WAF security protection based on cache hit results, the systems described herein may provide various advantages over traditional systems. For example, embodiments of the present disclosure may reduce the computational resources needed to implement WAF protection, thereby reducing the impact that WAF protection may have on network throughput. Additionally or alternatively, the systems described herein may enable administrators to make run-time conditional decisions on a per-transaction basis and selectively apply WAF security controls based on potential risks to resources that the WAFs are tasked with protecting.

Enabling WAF administrators to control how much WAF security is applied to requests may give WAF administrators valuable expressiveness to define custom security postures for their infrastructures. For example, an administrator may choose to apply "light" (or completely bypass) WAF security processing on cache hits and "full" WAF security processing on cache misses. As detailed below, this functional extension may facilitate a wide range of possibilities for expressing advanced cache optimization workflows based on a variety of factors and characteristics, including optimized processing based on user authentication and/or application or domain-specific segregation, among many others.

Figure 2:
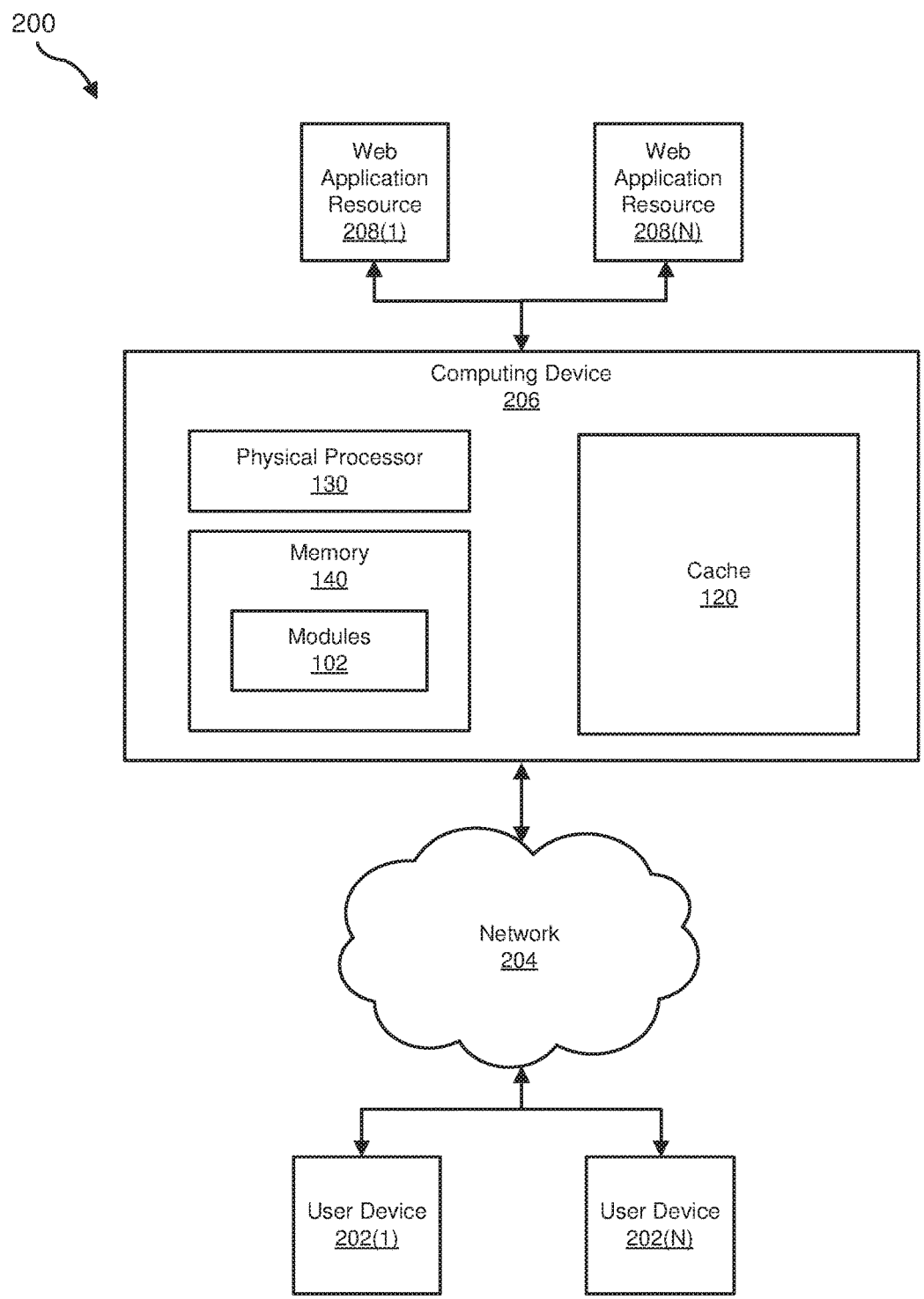
FIG. 2 is a block diagram of an additional example system for dynamically varying web application firewall security processes based on cache hit results.

The following will provide, with reference to FIGS. 1-2, detailed descriptions of example systems for dynamically varying web application firewall security processes based on cache hit results. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of an example system 100 for dynamically varying web application firewall security processes based on cache hit results. As illustrated in this figure, example system 100 may include one or more modules 102 for performing one or more tasks. As will be explained in greater detail below, modules 102 may include an identifying module 104 programmed to identify a request directed to a web application resource protected by a computing device. In addition, a first determining module 106 may be programmed to determine whether a response to the request will be served from a cache stored on the computing device. A second determining module 108 may also be programmed to determine, based at least in part on whether the response to the request will be served from the cache, a level of security processing to apply to the request. Finally, an applying module 110 may be programmed to apply the determined level of security processing to the request. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, one or more of modules 102 may represent modules stored and running on one or more computing devices, such as the devices illustrated in FIG. 2 (e.g., computing device 206). One or more of modules 102 in FIG. 1 may also represent all or portions of one or more special-purpose computers that may perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate dynamically varying web application firewall security processes based on cache hit results. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements, such as cache 120. As will be explained in greater detail below, cache 120 generally represents any type or form of data storage device capable of storing responses to requests for information from web application resources (such as an original content server, or "OCS"). In one example, cache 120 may be a part of a secure web gateway, such as a single-appliance reverse-proxy secure gateway device.

Example system 100 in FIG. 1 may be implemented in a variety of ways. For example, all or a portion of example system 100 may represent portions of example system 200 in FIG. 2. As shown in FIG. 2, system 200 may include a plurality of user devices 202(1)-202(N) in communication with a computing device 206 via a network 204. In one example, all or a portion of the functionality of modules 102 may be performed by computing device 206. For example, and as will be described in greater detail below, one or more of modules 102 from FIG. 1 may, when executed by physical processor 130 of computing device 206, cause computing device 206 to (i) identify, at computing device 206, a request directed to one or more of web application resources 208 (1)-208(N); (ii) determine, in response to identifying the request, whether a response to the request will be served from cache 120 stored on computing device 206; (iii) determine, based at least in part on whether the response to the request will be served from cache 120, a level of security processing to apply to the request; and (iv) apply the determined level of security processing to the request.

Computing device 206 generally represents any type or form of computing device (such as system 100 in FIG. 1) capable of performing web application resource caching and/or web application firewall processing. Examples of computing device 206 include, without limitation, a gateway (e.g., a secure web gateway), firewall (e.g., a web application firewall, such as a reverse proxy), bridge (e.g., a transparent bridge), switch, load balancer, etc., or any combination of the same. In one example, computing device 206 may represent a single-appliance reverse-proxy secure gateway device, such as SYMANTEC's PROXY SG device.

In one example, computing device 206 may protect an infrastructure, such as web application resources 208(1)-(N) in FIG. 2, from external threats by (i) intercepting requests directed to these resources, (ii) analyzing such requests for potential security threats, and then (iii) blocking or otherwise preventing requests that represent potential security threats. In some examples, computing device 206 may also cache content provided by web application resources 208 (1)-(N) in order to offload work from these backend devices. For example, computing device 206 may serve a request directly (as opposed to sending the request to a web application resource) from cache 120. Thus, in some embodiments, computing device 206 may act as a single appliance capable of performing both WAF security processes and caching of web application resource content.

User devices 202(1)-202(N) generally represent any type or form of computing device capable of reading computer-executable instructions. Additional examples of user devices 202(1)-202(N) include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between user devices 202(1)-202(N) and computing device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Web application resources 208(1)-208(N) generally represents any type or form of device capable of responding to web application content requests. Examples of web application resources 208(1)-208(N) include, without limitation, original content servers (or components of or applications served by such servers), application servers, web servers, storage servers, and/or database servers that may run certain software applications and/or provide various security, web, storage, and/or database services.

Figure 3:
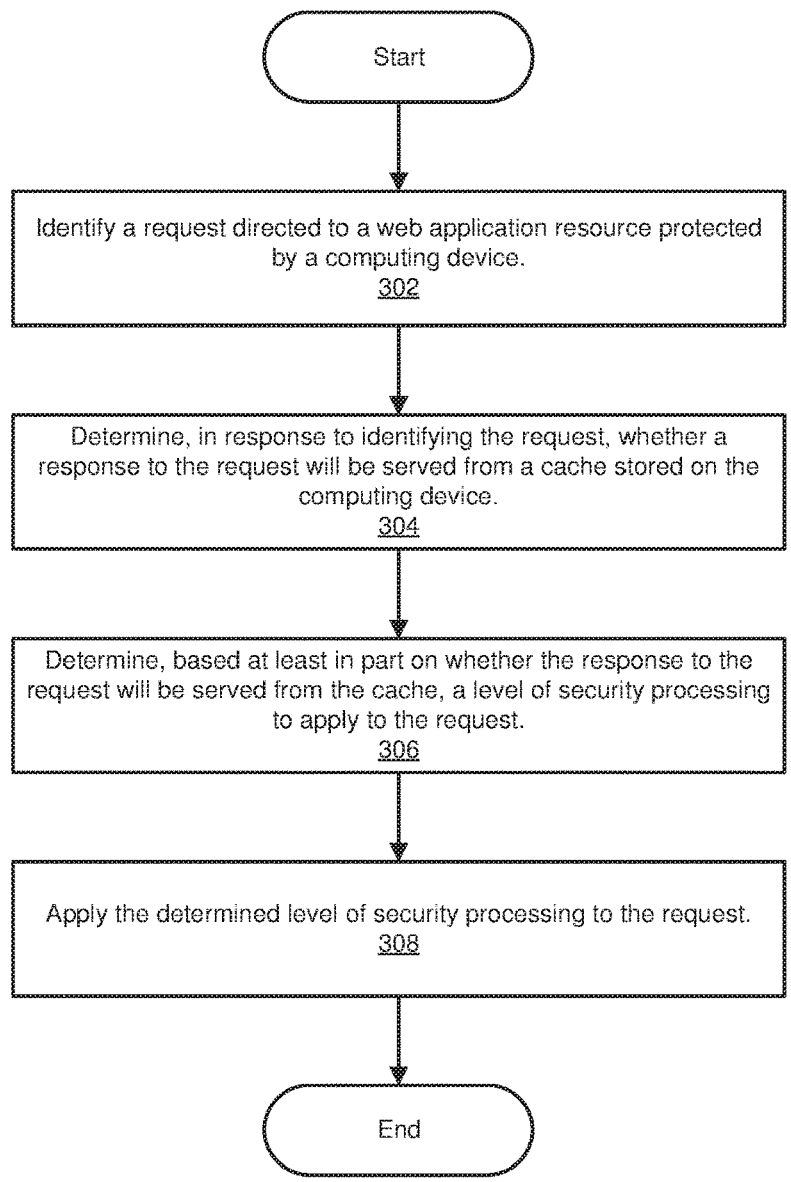
FIG. 3 is a flow diagram of an example method for dynamically varying web application firewall security processes based on cache hit results.

FIG. 3 is a flow diagram of an example computer-implemented method 300 for dynamically varying web application firewall security processes based on cache hit results. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below. The steps shown in FIG. 3 may be performed at least in part by processor 130.

As illustrated in FIG. 3, at step 302 one or more of the systems described herein, such as system 100 or computing device 206, may identify a request directed to a web application resource protected by the system. For example, identifying module 104 may, as part of computing device 206 in FIG. 2, receive a request directed to a web application resource 208(1) protected by computing device 206.

The systems described herein may perform step 302 in a variety of ways. In one example, identifying module 104 may identify the request by receiving or intercepting the same from an additional computing device, such as user device 202(1). In this example, the request from user device 202(1) may be directed to a resource protected by computing device 206 (e.g., web application resource 208(1)), and computing device 206 may (acting in its role as a web application firewall and/or reverse proxy device) intercept and/or process the same before it reaches web application resource 208(1). The request identified in step 302 may conform to a variety of protocols, including, for example, application protocols such as Hypertext Transfer Protocol (HTTP), File Transfer Protocol (FTP), Internet Message Access Protocol (IMAP), etc.

At step 304, one or more of the systems described herein may determine, in response to identifying the request, whether a response to the request will be served from a cache stored on the system. For example, first determining module 106 may, as part of computing device 206 in FIG. 2, determine whether a response to a request from user device 202(1) directed to web application resource 208(1) will be served from cache 120 (i.e., whether the request will involve a cache hit).

In some examples, static content provided by web application resources 208(1)-(N) may be cacheable. As such, computing device 206 may reduce the request/response burden on web application resources 208(1)-(N) by caching/storing and then responding to requests for this static content without sending the request in question to web application resources 208(1)-(N). In some examples, computing device 206 may experience a cache-hit ratio as high as 50% to 70%, which may dramatically reduce the demand on web application resources 208(1)-(N).

The systems described herein may leverage this infrastructure to perform step 304 in a variety of ways. In one example, first determining module 106 may evaluate whether a response to the request in question has already been provided by a web application resource and stored within cache 120. For example, first determining module 106 may determine whether the request in question matches prior requests from the same requestor (as determined, e.g., based on IP addresses, NIC addresses, etc.), requests directed to the same target (e.g., requests directed to the same domain, sub-domain, application, application content, etc.), etc. If a match is identified, then first determining module 106 may conclude that a response to the request in question may be served from cache 120 instead of again requesting a response to the same from the web application resource to which the request is directed.

At step 306, one or more of the systems described herein, such as system 100 or computing device 206, may determine, based at least in part on whether the response to the request will be served from the cache, a level (i.e., a respective degree, a respective quantity, etc.) of security processing to apply to the request.

The systems described herein may identify or determine the level of security processing to apply to the request in a variety of ways based on a variety of factors or conditions. In one example, second determining module 108 may lower or completely eliminate the level of security processing to be applied to a particular request if a response to the request will be served from cache 120. For example, since requests whose responses are served from cache 120 do not make the upstream trip from computing device 206 to web application resources 208(1)-(N) and back, these requests may pose less of a risk to web application resources 208(1)-(N). As such, an administrator may choose to reduce expensive WAF security processing in favor of performance by lowering the level of security processing to apply in such examples. In contrast, an administrator may choose to apply full or maximum security processing to non-cache-hit requests (i.e., requests that will not be served from cache 120). The phrase "lower level of security processing," as used herein, may refer to any amount from zero (i.e., no security processing) to slightly less than maximum security processing.

In other examples, the level of security processing to apply to a request may be based on whether the request is associated with an authenticated user. Since authenticated users are often trusted more than unauthenticated users, there may be less risk associated with requests from authenticated users. As such, an administrator may lower or conditionally bypass security processing on a request if the request originates from an authenticated user. In contrast, administrators may choose to apply maximum security processing to requests that originate from unauthenticated users. In some examples, computing device 206 may actively participate in authentication and may support many authentication techniques, such as active directory (AD), integrated windows authentication (IWA), lightweight directory access protocol (LDAP), Radius, security assertion markup language (SAML), etc.

In other examples, the level of security processing to apply to a request may be based on various characteristics of the request and/or the web application resource to which the request is directed. For example, the level of security processing to be applied to a request may be raised or lowered based on whether the web application resource is associated with a particular application, tenant, or subdomain, whether the web application resource serves static content or requires user input, etc. For example, maximum security processing may be applied to requests directed to a login page (e.g., regardless of whether the result will be served from cache 120) since such requests represent an increased security risk. In contrast, security processing may be reduced for requests that are (i) directed to a subdomain that does not receive user input and serves static content and (ii) will be served from cache 120.

In some embodiments, the systems described herein may enable administrators to define rules that include criteria for identifying the level of security processing to apply to a particular request. In these examples, determining the level of security processing to apply to a request may include identifying an administrator-defined level of security processing to apply to the request. As detailed above, enabling WAF administrators to control how much WAF security is applied to requests may give WAF administrators valuable expressiveness to define security postures for their infrastructures.

At step 308, one or more of the systems described herein, such as system 100 or computing device 206, may apply the determined level of security processing to the request. For example, upon identifying an administrator-defined level of security processing to apply to the request, applying module 110 may apply the same.

Figure 4:
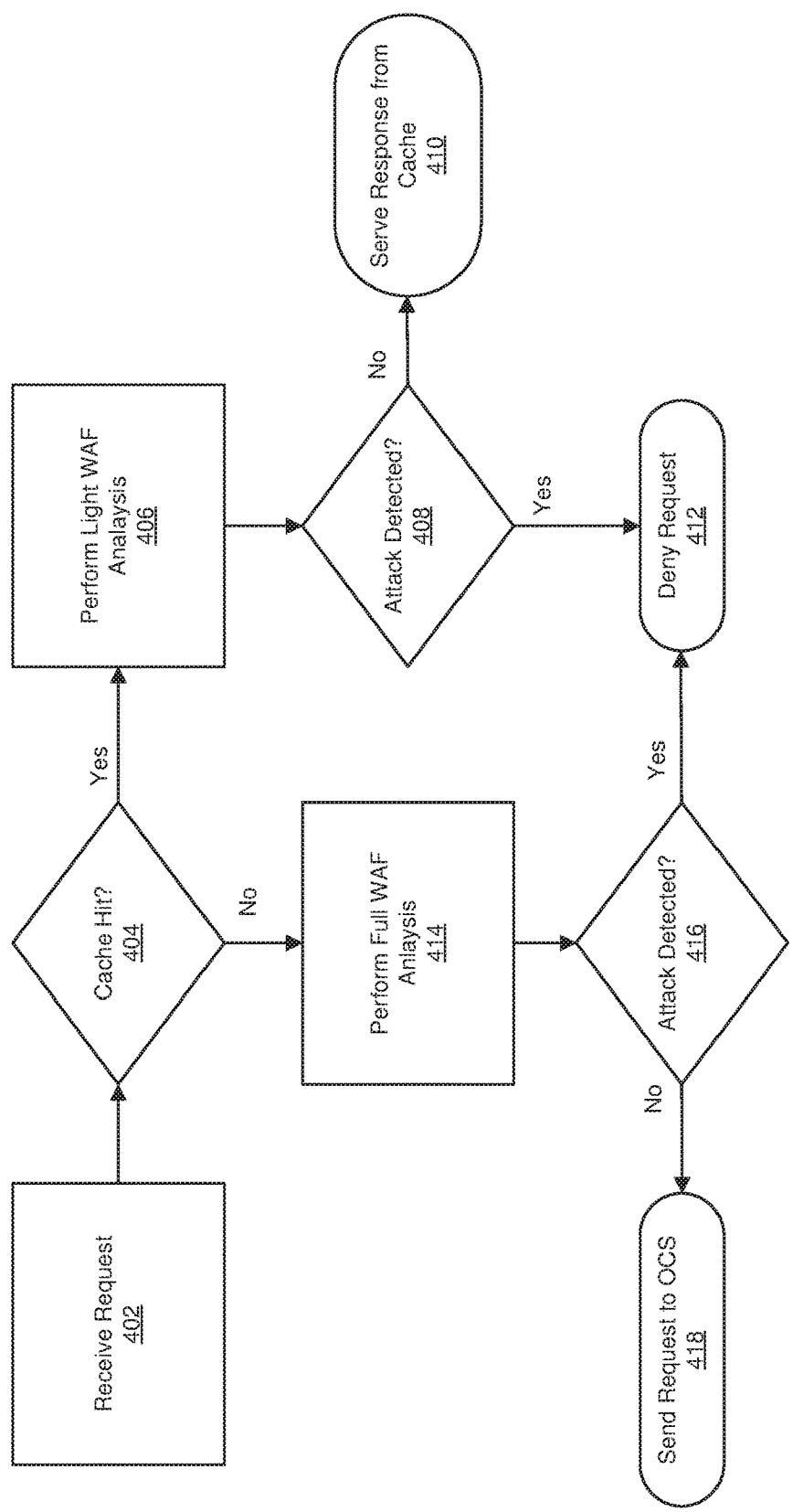
FIG. 4 is a flow diagram of another example method for dynamically varying web application firewall security processes based on cache hit results.

FIG. 4 illustrates an exemplary implementation of the process outlined in FIG. 3. As shown in this figure, at step 402 computing device 206 may receive a request, such as a request from user device 202(1) directed to an OCS such as web application resource 208(1). At step 404, computing device 206 may determine if the request will be served from cache 120. If a response to the request will be served from cache 120, then at step 406 computing device 206 may perform a reduced level of WAF security processing on the request since the request will not be forwarded to the OCS (and thus will not pose much of a security risk).

If this reduced level of security processing detects a potential security risk at step 408, then at step 412 computing device 206 may deny the request (and thus prevent the attack). If, however, a potential security risk is not detected, then computing device 206 may serve a response to the request from cache 120 in step 410 without forwarding the request to the OCS.

If, however, a response to the request will not be served from cache 120, then at step 414 computing device 206 may perform a high (i.e., a full) level of WAF security processing on the request since the request will be forwarded to the OCS (and thus pose a greater security risk to the same). If this increased level of security processing detects a potential security risk at step 416, then computing device 206 may deny or block the request at step 412, thereby preventing the attack. If, however, a potential security risk is not detected, then computing device 206 may forward the request to the OCS, which may in turn respond to the request.

As detailed above, customizing WAF security processing based on complex request parsing and cache hit results may offer a number of significant advantages. For example, the disclosed systems may enable administrators to custom define the amount of WAF security processing applied within their infrastructure based on a variety of factors, including whether the request will invoke a reverse-proxy cache hit, whether the request involves authenticated users (in which case less WAF security processing may be applied), whether a particular application is a target of the request (e.g., more WAF security processing may be applied to a request directed to a particular subdomain requiring user input), etc. The level of WAF security processing may also be granularly varied based on these factors, providing administrators with a dramatically expanded level of control and customization.

Figure 5:
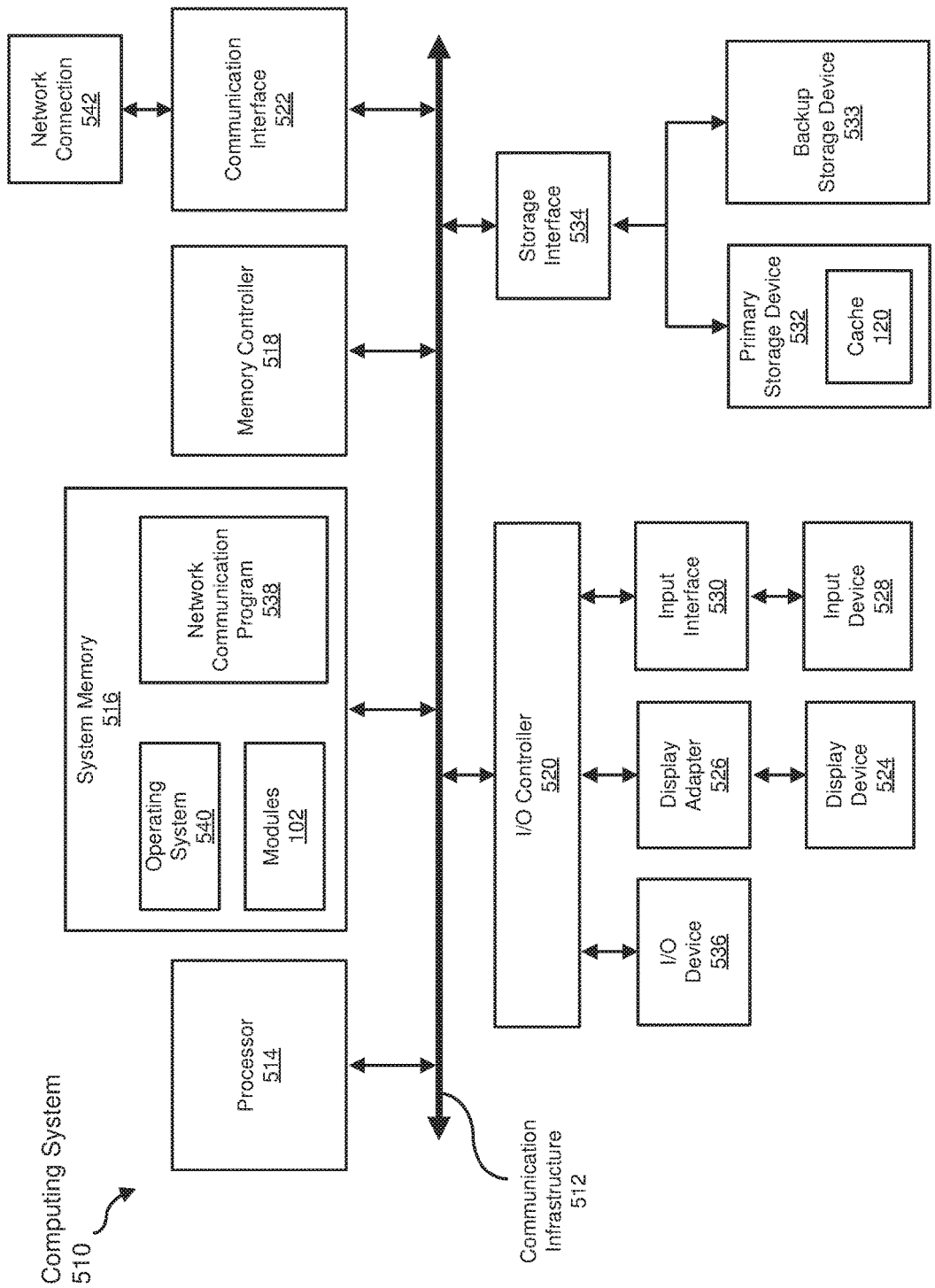
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIGS. 3-4). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device which may forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter which may facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, cache 120 from FIG. 1 may be stored and/or loaded in primary storage device 532.

In certain embodiments, storage devices 532 and 533 may read from and/or write to a removable storage unit which may store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
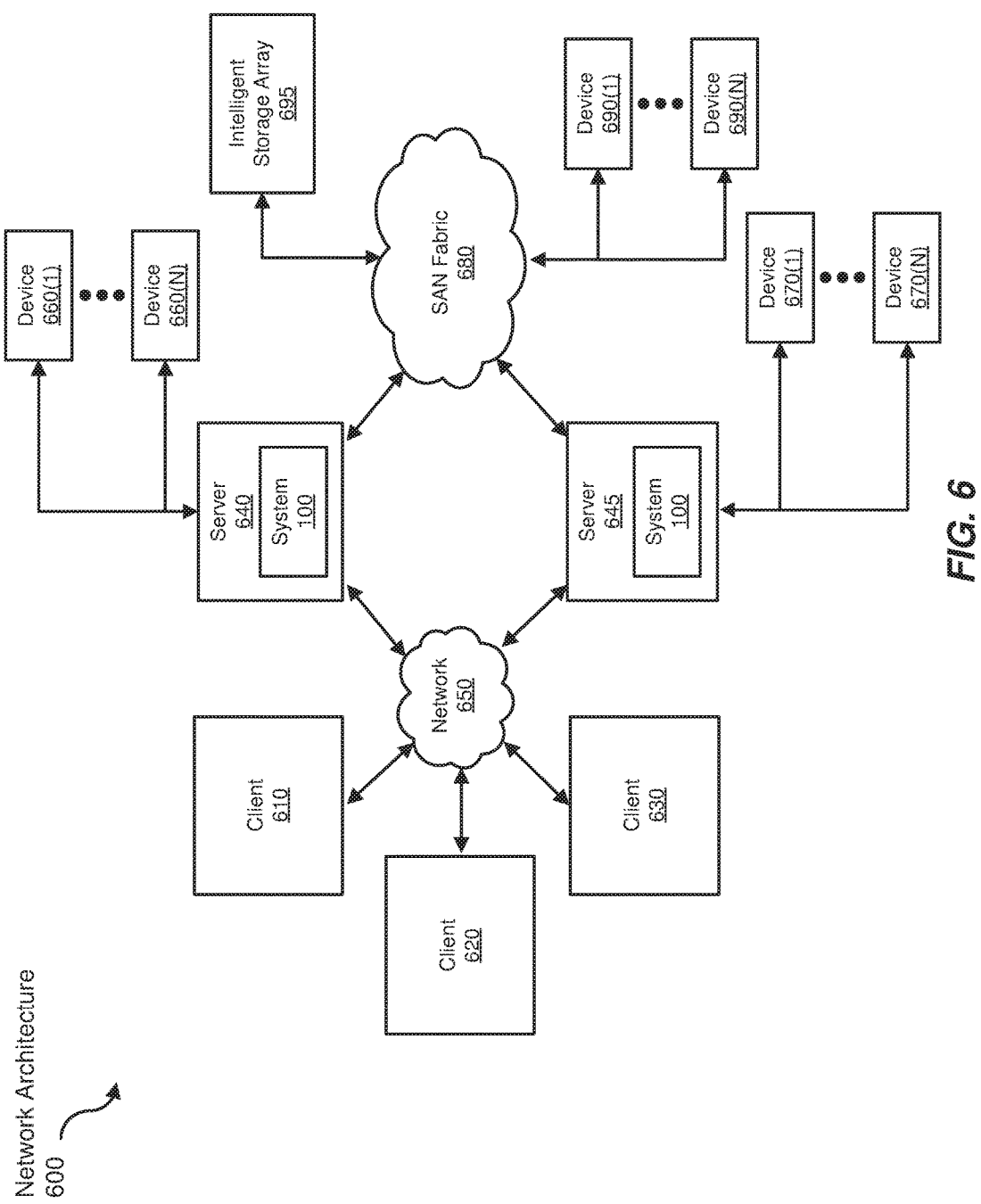
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5 and/or user devices 202(1)-202(N). Additional examples of client systems 610, 620, and 630 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device. Similarly, servers 640 and 645 generally represent computing devices or systems, such as application servers or database servers, which may provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

In examples, servers 640 and/or 645 may dynamically vary web application firewall security processes based on cache hit results. Servers 640 and/or 645 may be a gateway device, a secure web gateway, a single-appliance reverse-proxy secure gateway device, a web application firewall device, or the like.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices which may communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 (e.g., in a cache) using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for dynamically varying web application firewall security processes based on cache hit results.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures maybe implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and maybe varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a request to be transformed, transform the request, output a result of the transformation to indicate malicious activity, use the result of the transformation to perform a security action, or a combination thereof. Security actions may include denying a request, reporting a request to an administrator, redirecting the request, performing additional security processing on the request, etc. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically varying web application firewall security processes based on cache hit results, at least a portion of the method being performed by a computing device comprising at least one processor, the method comprising:
- identifying, at the computing device, a request directed to a web application resource protected by the computing device;
- determining, in response to identifying the request, whether a response to the request will be served from a cache stored on the computing device;
- determining, based at least in part on whether the response to the request will be served from the cache, a level of security processing to apply to the request; and
- applying the determined level of security processing to the request.

2. The method of claim 1, wherein:
- determining the level of security processing to apply to the request comprises identifying an administrator-defined level of security processing to apply to the request; and
- applying the determined level of security processing to the request comprises applying the administrator-defined level of security processing to the request.

3. The method of claim 1, wherein determining the level of security processing to apply to the request comprises:
- determining that the response to the request will be served from the cache stored on the computing device; and
- lowering the level of security processing to apply to the request.

4. The method of claim 3, further comprising:
- determining, by applying the lowered level of security processing to the request, that the request does not represent a security risk; and
- serving the request with the response from the cache stored on the computing device.

5. The method of claim 1, wherein the determined level of security processing is further based on at least one of:
- at least one characteristic of the request; and
- at least one characteristic of the web application resource to which the request is directed.

6. The method of claim 1, wherein determining the level of security processing to apply to the request comprises:
- determining that the request is associated with an authenticated user; and
- lowering the level of security processing to apply to the request.

7. The method of claim 1, wherein determining the level of security processing to apply to the request comprises:
- determining that the web application resource to which the request is directed serves static content that does not require user input; and
- lowering the level of security processing to apply to the request.

8. The method of claim 1, further comprising:
- identifying, by applying the determined level of security processing to the request, a potential security risk associated with the request; and
- performing, in response to identifying the potential security risk, a security action in an attempt to ameliorate the potential security risk.

9. The method of claim 1, wherein the computing device comprises at least one of:
- a web application firewall device; and
- a gateway.

10. A system for dynamically varying web application firewall security processes based on cache hit results, the system comprising:
- a memory device;
- an identifying module, stored in the memory device, that identifies a request directed to a web application resource protected by the system;
- a first determining module, stored in the memory device, that determines, in response to identifying the request, whether a response to the request will be served from a cache stored on the system;
- a second determining module, stored in the memory device, that determines, based at least in part on whether the response to the request will be served from the cache, a level of security processing to apply to the request;
- an applying module, stored in the memory device, that applies the determined level of security processing to the request; and
- at least one physical processor that executes the identifying module, the first determining module, the second determining module, and the applying module.

11. The system of claim 10, wherein:
- determining the level of security processing to apply to the request comprises identifying an administrator-defined level of security processing to apply to the request; and
- applying the determined level of security processing to the request comprises applying the administrator-defined level of security processing to the request.

12. The system of claim 10, wherein determining the level of security processing to apply to the request comprises:
- determining that the response to the request will be served from the cache stored on the system; and
- lowering the level of security processing to apply to the request.

13. The system of claim 12, further comprising:
- a third determining module, stored in the memory device, that determines, by applying the lowered level of security processing to the request, that the request does not represent a security risk; and
- a serving module, stored in the memory device, that serves the request with the response from the cache stored on the system.

14. The system of claim 10, wherein the determined level of security processing is further based on at least one of:
- at least one characteristic of the request; and
- at least one characteristic of the web application resource to which the request is directed.

15. The system of claim 10, wherein determining the level of security processing to apply to the request comprises:
- determining that the request is associated with an authenticated user; and
- lowering the level of security processing to apply to the request.

16. The system of claim 10, wherein determining the level of security processing to apply to the request comprises:
- determining that the web application resource to which the request is directed serves static content that does not require user input; and
- lowering the level of security processing to apply to the request.

17. The system of claim 10, wherein the identifying module, stored in the memory device, identifies, by applying the determined level of security processing to the request, a potential security risk associated with the request and further comprising a performing module, stored in the memory device, that performs, in response to identifying the potential security risk, a security action in an attempt to ameliorate the potential security risk.

18. The system of claim 10, wherein the system comprises at least one of:
- a web application firewall device; and
- a gateway.

19. A non-transitory computer-readable medium comprising one or more computer-executable instructions that, when executed by at least one processor of a computing device, cause the computing device to:
- identify, at the computing device, a request directed to a web application resource protected by the computing device;
- determine, in response to identifying the request, whether a response to the request will be served from a cache stored on the computing device;
- determine, based at least in part on whether the response to the request will be served from the cache, a level of security processing to apply to the request; and
- apply the determined level of security processing to the request.

20. The non-transitory computer-readable medium of claim 19, wherein:
- the computer-executable instructions that cause the computing device to determine the level of security processing to apply to the request comprise computer-executable instructions to cause the computing device to identify an administrator-defined level of security processing to apply to the request; and
- the computer-executable instructions that cause the computing device to apply the determined level of security processing to the request comprise the computer-executable instructions that cause the computing device to apply the administrator-defined level of security processing to the request.

* * * * *